Dec. 11, 1956  T. R. BLACK  2,773,510
MANUALLY OPERATED PILOT CONTROLLED REGULATING VALVE
Filed Dec. 11, 1953  2 Sheets-Sheet 1
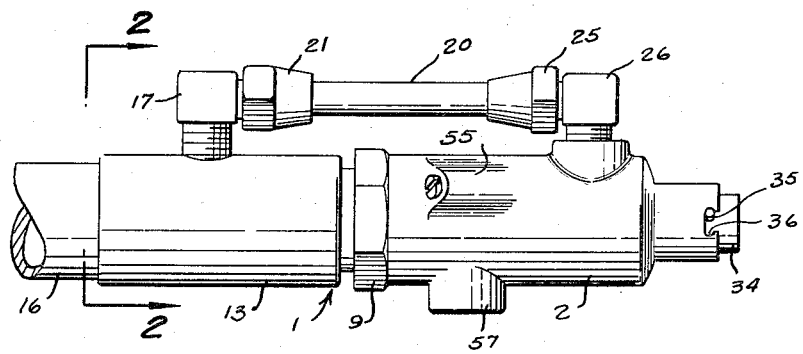
FIG. 1
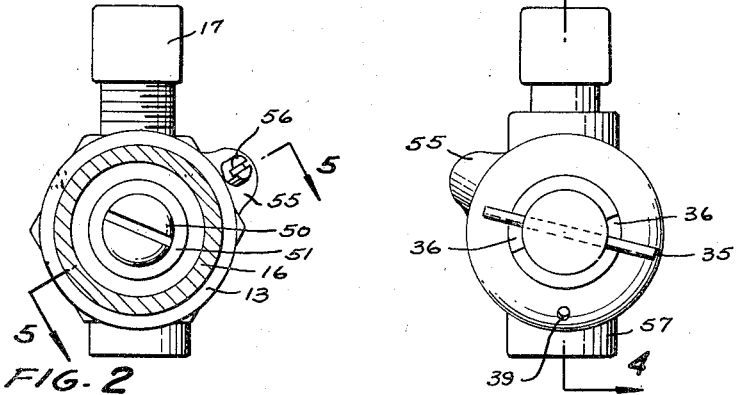
FIG. 2
FIG. 3
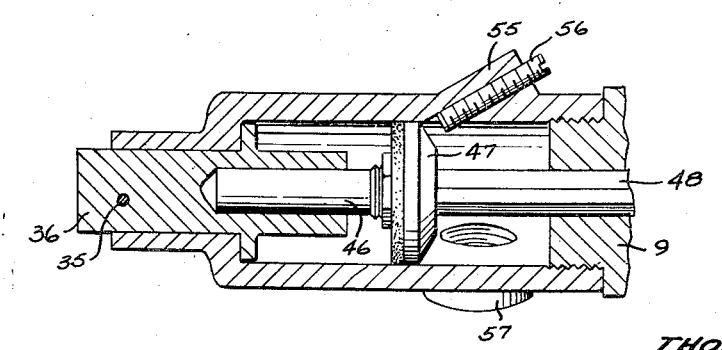
FIG. 5
INVENTOR.
THOMAS R. BLACK
BY
McMorrow, Berman & Davidson
ATTORNEYS

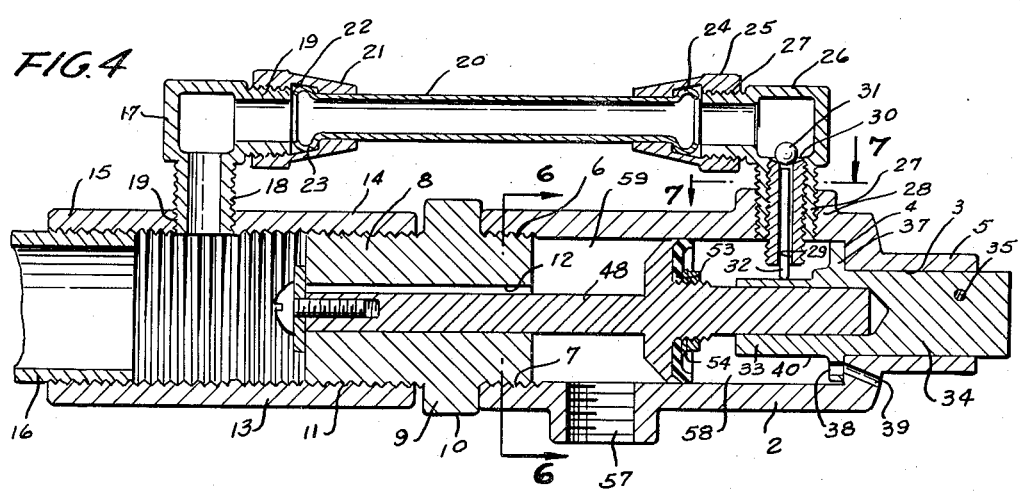
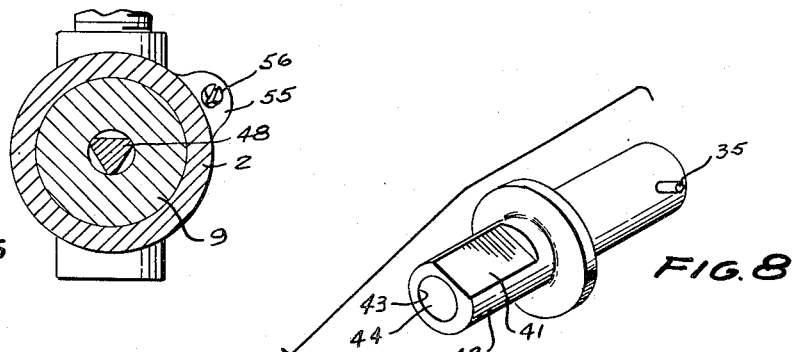
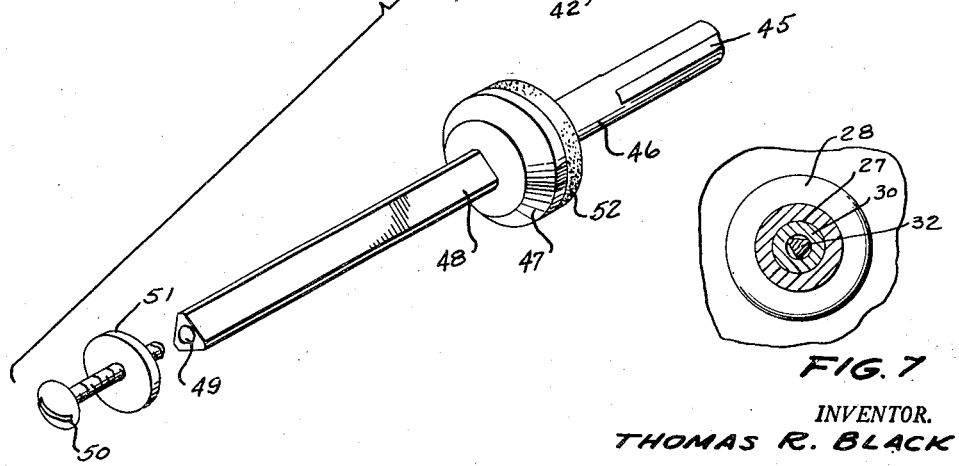

United States Patent Office 2,773,510
Patented Dec. 11, 1956

2,773,510

MANUALLY OPERATED PILOT CONTROLLED REGULATING VALVE

Thomas R. Black, Port Isabel, Tex.

Application December 11, 1953, Serial No. 397,567

2 Claims. (Cl. 137—614.14)

This invention relates to fluid flow regulating devices, and more specifically, to control apparatus for liquid distribution circuits.

One of the primary objects of this invention is to provide a valve control for a fluid circulating system which is silent and positive in operation.

A further object of this invention is to provide a water valve for a water distribution system which is actuated by hydraulic force.

A still further object of this invention is to provide a valve control for a fluid distribution line wherein the valve is alternately actuated, selectively, from open to closed position by alternately exposing opposite sides of the control element to the fluid pressure of the line.

It is another object of this invention to provide valve apparatus including a movable valve element which is operable under differentials of fluid pressure to alternately open and close the valve apparatus.

A further object of this invention is to provide a valve of the type described and including a manually operated member to effect a venting of the valve element on one side thereof to effect an unbalance of fluid pressure operating on the valve element whereby the element is moved to close the valve.

This invention also contemplates as a further object the provision of a valve of the type referred to above which is non-complex in construction, assembly and operation, and which may be inexpensively manipulated, installed, and maintained.

Other and further objects of this invention will become apparent from a consideration of the following specification when read in the light of the annexed drawings, in which:

Figure 1 is a side elevation of a valve constructed in accordance with the teachings of this invention;

Figure 2 is a cross-sectional view taken on the vertical plane of line 2—2 of Figure 1, and looking in the direction of the arrows;

Figure 3 is an end elevation of the device illustrated in Figure 1;

Figure 4 is a longitudinal medial cross-sectional view of the valve illustrated in Figure 1;

Figure 5 is an enlarged detail cross-sectional view, partially in elevation, and taken on the inclined plane of line 5—5 of Figure 2, and looking in the direction of the arrows;

Figure 6 is a cross-sectional view taken on the vertical plane of line 6—6 of Figure 4, and looking in the direction of the arrows;

Figure 7 is a cross-sectional view taken on the horizontal plane of line 7—7 of Figure 4; and Figure 8 is an enlarged exploded perspective view of one of the movable elements of the valve.

Referring now more specifically to the drawings, reference numeral 1 designates, in general, a valve constructed in accordance with this invention. As shown in Figures 1 and 4, the valve 1 comprises an elongated valve casing 2 having a substantially cylindrical transverse cross-sectional configuration. The casing 2 is reduced in internal diameter at 3 adjacent one of its open ends to form a shoulder 4, and this end of valve body is necked down or reduced in external diameter to form the hollow cylindrical tubular end extension 5. The other end of the valve body 2 is open and internally threaded at 6 to receive the externally threaded end 7 of an elongated connector designated generally by the reference numeral 8.

The connector 8 is formed, intermediate its ends, with a radial flange 9 having a polygonal periphery 10 adapted for engagement by a pipe or other types of wrenches during the assembly of the valve. The other end 11 of the connector 8 is externally threaded to serve a function to be described. In Figure 4 it is seen that the connector 8 is constructed with an elongated substantially centrally positioned bore extending throughout its length to form a fluid and guide passage 12.

A hollow cylindrical pipe 13 is internally threaded throughout its length for connection at one of its ends 14 with the externally threaded end 11 of the connector 8. The other end 15 is threadedly connected with the discharge end 16 of a water main or other types of fluid circuits under pressure.

An elbow joint 17 has an end 18 threaded into an opening 19 formed in the wall of the pipe 13. The other end 19 is connected with one end of an elongated tubular member 20 by a coupling element 21. As is clearly seen in Figure 4 of the drawings, the coupling element 19 is constructed with an inner circumferential recess 22 intermediate its ends, the recess 22 receiving therein the enlarged flared end 23 of the tubular member 20. The other end 24 of the member 20 is also flared and received within one end of a second coupling 25 identical with coupling 21 in construction.

An elbow joint 26 has an externally threaded end 27 connected with the other end of the coupling 25. The other end 27 of the joint 26 is externally threaded for engagement within an internally threaded boss 28 formed in the valve casing 2 adjacent its remote end. The end 27 is also internally threaded for connection with an elongated externally threaded sleeve having an axially extending substantially centrally positioned guide passage 29 formed therein and extending longitudinally therethrough. The inner end of the sleeve is provided with a concave surface 30 comprising a valve seat for a check valve 31 which is free for movement within the joint 26. An elongated pin 32 having a substantially triangular transverse cross-sectional configuration is mounted within the guide passage 29 for reciprocation between the check valve 31 and the inner end 33 of a stub shaft 34.

From Figure 4 it is seen that the stub shaft 34 is mounted for rotation within the tubular extension 5 of the valve casing 2, and carries a manually operated pin or handle 35 which extends diametrically thereof and has opposed projecting ends adapted for swinging movement between the ends of a pair of diametrically opposed slots 36 formed in the casing extension 5 (see Figs. 1 and 4).

The stub shaft 34 is provided with a radial flange 37 intermediate its ends and has an opening 38 extending transversely thereof adjacent its marginal edge. As seen in Figure 4, the flange 37 is disposed within the valve casing 2 with a side thereof in bearing relationship with the shoulder 4, and that with the shaft turned to the position illustrated in the referred to figure, the opening 38 is adapted to align with a vent 39 which is formed in the adjacent end wall of the valve casing 2. In all other positions, the flange 37 moves to cover the inner end of the vent 39.

The inner end 33 of the stub shaft 34 is formed with a cam surface 40 against which the lower end of the pin 32 slidably engages. In Figure 4, the valve is shown in its closed position with the lower pin riding in the low side 41 (see Fig. 8) of the cam 40 and the valve 31 resting in its seat adjacent the upper end of the pin. When the stub shaft 34 is rotated to move the high side 42 of the cam 40 under the pin 32, the pin is raised and the upper end thereof engages against and raises the check valve 31.

The inner end 33 of the stub shaft 34 is constructed with a circular axially extending pocket 43 to slidably receive one end of a plunger element 46 having a plurality of circumferentially and axially extending spaced grooves 45. The grooves 45 serve to vent the pocket 43 of accumulated fluids into the chamber 58.

The plunger element 46 includes an enlarged piston 47 positioned intermediate the ends of the element and adapted for reciprocating movement within the valve casing 2. The other end 48 is elongated for extension through the guide passage 12. The end 48 is axially tapped at 49 to receive the bolt 50 which secures a washer 51 rigidly thereon. It should be noticed that the diameter of the washer 51 is greater than the diameter of the passage 12 whereby the adjacent end of the latter is effectively closed.

To effect a substantially water-tight seal between the piston 47 and the adjacent wall portion of the valve casing 2, a liner 52 formed of leather, rubber or other well known materials is seated thereon and held thereagainst by the lock nut 53 and washer 54.

Referring to Figures 1 and 5, it is seen that the valve casing 2 is formed with an enlarged internally threaded boss 55 inclined at an angle to the longitudinal axis of the valve casing 2. The boss 55 receives a set screw 56, the inner end of which extends downwardly into the path of movement of the piston 47 to adjustably limit the movement thereof in one direction.

The valve assembly 1 is completed by providing a discharge part 57 in the valve casing 2 adjacent its threaded end 6.

Assuming that the water main is carrying water or another fluid under pressure, and the component elements of the valve assembly are in their closed position, the parts thereof are disposed, as shown in Figure 4. If it be desired to actuate the valve to its open position, the operator turns the pin 35 causing the stub shaft 34 and its associated cam 33 to rotate so that the high side 42 thereof engages the lower end of the pin 32. This forces the pin 32 to move upwardly and unseat the check valve 31.

With the opening of the valve 31, fluid under pressure flows through the water main, pipe 14, elbow joint 17, tubular element 20, elbow joint 26, passage 29 and into the valve casing 2 on one side of the piston 47. Upon entering the valve body 2, the fluid exerts a pressure on the piston 47 causing it to move longitudinally (to the left, as viewed in Fig. 4) until the piston 47 engages the inner end of the stop 56. The fluid completely fills the chamber since the flange 37 has been turned to block the vent 39.

As the piston 47 moves in the above described direction, washer 51 is moved away from the adjacent end of the guide passage 12 to admit fluid from the water main, pipe 14 and passage 12 to the chamber of the valve casing 2. From the chamber 59 the fluid is discharged through the port 57.

To close the valve 1, the pin 35 is rotated to align the opening 38 with the vent 39 permitting fluid within chamber 58 to escape therefrom and simultaneously permitting lowering of the pin 32, whereby fluid pressure in the elbow 26 forces the check valve 31 into its seat and cutting off all fluid supply to the chamber 58.

With the venting of the chamber 58 fluid pressure on the adjacent side of the piston 47 is reduced. However, line pressure is still exerted on the other side of the piston 47, and this pressure differential now effects longitudinal movement of the piston 47 in the other direction causing the washer 51 to again seal the adjacent end of the passage 12, whereby the further flow of fluid to chamber 59 is prevented.

Having described and illustrated one embodiment of this invention in detail, it will be understood that the same is offered by way of example, and that the invention is to be limited only by the scope of the following claims.

What is claimed is:

1. A fluid flow regulating valve comprising: an elongated valve casing having an inlet side and outlet side; a closure member disposed between said inlet and outlet sides; a piston reciprocably mounted in said casing to the outlet side of said closure; a fluid conduit formed through said closure to permit fluid communication between the inlet and outlet sides of said casing and between the inlet side of said casing and a first side of said piston; valve means carried by said piston for opening communication through said conduit when said piston is reciprocably moved in a direction from outlet toward inlet side of said casing under influence of fluid pressure acting on the second side of said piston; a by-pass line connecting the inlet side with the outlet side of said casing at a point on the second side of said piston; a ball check valve in said by-pass line normally closing fluid flow communication through said by-pass line from said inlet to said second side of said piston; a vent opening in said casing disposed to the second side of said piston; and manually actuatable means for simultaneously closing said vent opening and opening said check valve; said manually actuatable means comprising rotatable means extending exteriorly of said casing, a ball unseating member mounted reciprocably in said casing for reciprocable movement in a first direction to cause unseating and opening of said ball check valve and in a second direction to permit seating and closing of said ball check valve, and means connecting said manually rotatable means with said ball unseating member for converting rotary movement of the former to reciprocable movement of the latter.

2. The combination of claim 1 and wherein said rotatable means comprises a stub shaft provided with an outwardly extending peripheral flange disposed in bearing relationship with said vent opening operable to close communication from said casing to said vent opening when said rotatable means is rotated to a position to cause unseating and opening of said ball check valve; said flange formed with a cut-out located to register with said vent opening and to open communication from said casing to said vent opening when said rotatable means is rotated to a position to permit seating and closing of said ball check valve.

References Cited in the file of this patent
UNITED STATES PATENTS

| | | |
|---|---|---|
| 1,087,399 | Phelps | Feb. 17, 1914 |
| 2,333,205 | Shafer | Nov. 2, 1943 |
| 2,361,225 | Meyer | Oct. 24, 1944 |